(12) United States Patent
Hirotani (10) Patent No.: US 8,167,604 B2
(45) Date of Patent: May 1, 2012

(54) FLUID SPRING AND MOLDING APPARATUS

(75) Inventor: Kaoru Hirotani, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 12/455,464

(22) Filed: Jun. 2, 2009

(65) Prior Publication Data
US 2009/0311361 A1 Dec. 17, 2009

(30) Foreign Application Priority Data

Jun. 13, 2008 (JP) ................................. 2008-155234

(51) Int. Cl.
*B29C 43/02* (2006.01)

(52) U.S. Cl. ...... 425/412; 425/415; 425/423; 425/451.9

(58) Field of Classification Search ................ 267/119, 267/130, 118; 72/350, 351, 453.13; 425/412, 425/415, 416, 423, 451.9, DIG. 127
See application file for complete search history.

(56) References Cited

U.S. PATENT DOCUMENTS

| | | | |
|---|---|---|---|
| 2,994,301 A * | 8/1961 | Kirsch | 267/119 |
| 4,765,227 A | 8/1988 | Balazs et al. | |
| 6,170,809 B1 * | 1/2001 | Cotter | 267/119 |
| 6,796,159 B2 * | 9/2004 | Kelm et al. | 72/351 |

FOREIGN PATENT DOCUMENTS

| | | |
|---|---|---|
| JP | 51-018063 A | 2/1976 |
| JP | 58-218400 A | 12/1983 |
| JP | 4-178225 A | 6/1992 |
| JP | 2001-001064 A | 1/2001 |

* cited by examiner

*Primary Examiner* — Richard Crispino
*Assistant Examiner* — Thukhanh Nguyen
(74) *Attorney, Agent, or Firm* — Carrier Blackman & Associates, P.C.; Joseph P. Carrier; William D. Blackman (57) ABSTRACT

A fluid spring is provided with a sleeve, a first chamber configured to accommodate a fluid and formed in the sleeve, a hollow piston rod, a second chamber configured to accommodate the fluid and formed in the hollow piston rod, and a communicating passage configured to make the first chamber and the second chamber communicate with each other and formed in an end portion of the hollow piston rod. A part of the hollow piston rod is displacably accommodated in the first chamber. The communicating passage only permits the fluid to flow in a direction from the first chamber to the second chamber.

4 Claims, 13 Drawing Sheets

FLUID SPRING AND MOLDING APPARATUS

BACKGROUND OF THE INVENTION

1. Field of the Invention

The present invention relates to a fluid spring in which a fluid circulates in a sleeve and a hollow piston rod, and to a molding apparatus having the fluid spring.

2. Background Art

Generally, a side panel which is a constructional member of an automobile body is manufactured by press-molding. Usually, such a side panel is a press-molded article of a complex shape, one part of which is subjected to relatively simple molding and one part of which is subjected to relatively complicated molding. The relatively simple molding is, e.g., the molding of a curved portion having a large radius of curvature. The relatively complicated molding is, e.g., the molding of a curved portion having a small radius of curvature, or a deep drawing portion having a large depth.

Meanwhile, it is difficult to simultaneously mold a curved portion having a large radius of curvature and a curved portion having a small radius of curvature in a single process-step. Thus, in such a case, a curved portion having a large radius of curvature is first molded. Next, a curved portion having a small radius of curvature is molded. Incidentally, a molding apparatus which successively performs such molding processing is described in, e.g., JP-A-2001-001064.

That is, first, a side panel is supported by clamping an end portion thereof. In this state, e.g., a central portion of the side panel is pressed by a lower die and a movable die. Next, a part between the central portion and the end portion is pressed by the lower die and an upper die. Thus, the side panel is molded. Incidentally, the movable die is held in the upper die. With the displacement of the upper die along a vertical direction, the movable die moves closer to or away from the lower die.

More specifically, at the molding of a side panel, a clamping mechanism for clamping an end portion of the side panel abuts against the side panel. Subsequently, the upper die descends towards the lower die under the action of an urging mechanism. Accordingly, at that time, an urging force of the urging mechanism should be larger than a clamping force of the clamping mechanism. This is because of the fact that when the clamping force of the clamping mechanism is larger than the urging force of the urging mechanism, it is difficult to cause the upper die to descend. Thus, it is difficult to mold the side panel.

On the other hand, upon completion of molding of the side panel, the upper die and the movable die first ascend to expose the side panel. Next, the end portion of the side panel is released from the clamping mechanism. Accordingly, at that time, it is necessary to set the clamping force to be larger than the urging force of the urging mechanism. This is because if the opposite were the case it would be difficult to cause the upper die and the movable die to ascend.

As is understood from the foregoing description, one such a molding apparatus requires that the relationship in magnitude between the force of the clamping mechanism and that of the urging mechanism before the molding of the side pane is reversed after the molding. Regarding this, in the molding apparatus described in JP-A-2001-001064, the internal pressure of a piston of the clamping mechanism is adjusted by introducing and removing operating oil into and from an oil chamber of the piston. Consequently, the clamping force is controlled.

In a case where the molding apparatus is constructed so that operating oil can be introduced into and removed from the oil chamber of the piston, the molding apparatus inevitably requires a tank for storing oil, a pressure source (e.g., compressed air) introducing and removing operating oil into and from an oil chamber, and piping for bridging among the tank, the pressure source, and the piston. This causes problems that the size of the molding apparatus is increased, that the structure of the molding apparatus is complicated, and that a sharp rise of equipment investment occurs.

SUMMARY OF THE INVENTION

One or more embodiments of the invention provide a fluid spring and a molding apparatus having such a fluid spring which can be simply configured and can reduce equipment investment.

In accordance with one or more embodiments of the invention, a fluid spring 20 is provided with: a sleeve 50; a first chamber 58 configured to accommodate a fluid and formed in the sleeve 50; a hollow piston rod 52, wherein a part of the hollow piston rod 52 is displacably accommodated in the first chamber 58; a second chamber 72 configured to accommodate the fluid and formed in the hollow piston rod 52; and a communicating passage 78 configured to make the first chamber 58 and the second chamber 72 communicate with each other and formed in an end portion of the hollow piston rod 52, wherein the communicating passage 78 only permits the fluid to flow in a direction from the first chamber 58 to the second chamber 72.

In the above configuration, the fluid spring switches between a circulation stopped state in which the fluid stays in the first chamber and the second chamber, and a circulation flowing state in which the fluid circulates in the first chamber and the second chamber, based on the pushing pressure applied to the hollow piston rod. By this stoppage and start of circulation, an internal pressure of the fluid spring can appropriately be adjusted.

In addition, because the fluid is circulated in the fluid spring, there is no necessity for additionally providing a tank and piping. Consequently, the configuration of the fluid spring can be simplified. In addition, the equipment investment can be reduced.

The above fluid spring 20 may further be provided with: a displacing piston rod 54 provided at an end portion of the hollow piston rod 52 and including: a displacing portion 94 which slides while maintaining contact with an inner wall of the hollow piston rod 52; and an exposing portion 92 connected to the displacing portion 94 so as to be exposed from the hollow piston rod 52, and an additional passage 76 configured to make the first chamber 58 and the second chamber 72 communicate with each other and formed between an inner circumferential wall and an outer circumferential wall of the hollow piston rod 52, wherein the additional passage 76 is closed when the displacing portion 94 is positioned in its upper dead center.

By this configuration, the switching between the circulation-stopped-state/circulation-flowing-state can be facilitated.

Moreover, in accordance with one or more embodiments of the invention, a molding apparatus 10 is provided with: a lower die 12; an upper die 14 movable closer to and away from the lower die 12; a movable die 16 held by the upper die 14 and movable with respect to the upper die 14; a movable die displacing mechanism 18 provided in the movable die 16 to urge the movable die 16 in a direction away from the lower die 12; and a fluid spring 20 provided in the upper die 14 to urge the movable die 16 in a direction away from the upper die 14. In the molding apparatus, the fluid spring 20 is provided with: a sleeve 50; a first chamber 58 configured to accommodate a fluid and formed in the sleeve 50; a hollow piston rod 52, wherein a part of the hollow piston rod 52 is displacably accommodated in the first chamber 58; a second chamber 72 configured to accommodate the fluid and formed in the hollow piston rod 52; and a communicating passage 78 configured to make the first chamber 58 and the second chamber 72 communicate with each other and formed in an end portion of the hollow piston rod 52, wherein the communicating passage 78 only permits the fluid to flow in a direction from the first chamber 58 to the second chamber 72.

That is, the molding apparatus is provided with the above fluid spring. As described above, the internal pressure of this fluid spring is appropriately adjusted by switching between the circulation stopped state and the circulation flowing state of a fluid. Accordingly, the apparatus is controlled such that, for example, when the die is closed (when molding), the fluid spring generates a pushing pressure that is larger than the pushing pressure of the clamping mechanism, and when the die is opened, the fluid spring generates a pushing force that is smaller than the pushing force of the clamping mechanism. Thus, when the die is closed, relatively difficult molding can be performed earlier with the movable die. In addition, at the die-opening, the upper die 14 and the movable die 16 can simultaneously be lifted while the movable die 16 is lifted.

Thus, according to the embodiments of the invention, the movable die of the molding apparatus can be lowered or raised at a predetermined timing.

In the apparatus, the fluid spring may further be provided with: a displacing piston rod 54 provided at an end portion of the hollow piston rod 52 and including: a displacing portion 94 which slides while maintaining contact with an inner wall of the hollow piston rod 52; and an exposing portion 92 connected to the displacing portion 94 so as to be exposed from the hollow piston rod 52; and an additional passage 76 configured to make the first chamber 58 and the second chamber 72 communicate with each other and formed between an inner circumferential wall and an outer circumferential wall of the hollow piston rod 52. The additional passage 76 may be closed when the displacing portion 94 is positioned in its upper dead center. By this configuration, the aforementioned switching between circulation stoppage and circulation flowing is facilitated.

Furthermore, preferably, the fluid is gas. Gas is compressible. Thus, the aforementioned internal pressure can easily be changed. In addition, gas has advantages in ease of handling thereof and in cost.

According to the embodiments, a fluid spring is constructed so that switching between stoppage and flowing of circulation of a fluid inside the fluid spring is enabled. The internal pressure of this fluid spring is adjusted by stopping and starting the fluid circulation. That is, the difference between the extending force at the time of contraction and the extending force at the time of extension can be made such that the extending force at the time of contraction increases and the extending force at the time of extension after the fluid spring has contracted is reduced.

Accordingly, the movable die of the molding apparatus can be lowered or raised at a predetermined timing by incorporating this fluid spring into the molding apparatus.

In addition, the fluid spring according to the embodiment is constructed such that the circulation of a fluid in the fluid spring is started or stopped. Accordingly, the configuration of equipment provided in the apparatus is simplified. In addition, the present embodiment can obtain the advantage of reducing the equipment investment.

Other aspects and advantages of the invention will be apparent from the following description, the drawings and the claims.

DETAILED DESCRIPTION OF THE EXEMPLARY EMBODIMENTS

An exemplary embodiment of a fluid spring according to the invention is described in detail in association with a molding apparatus having the fluid spring by referring to the accompanying drawings.

Figure 1:
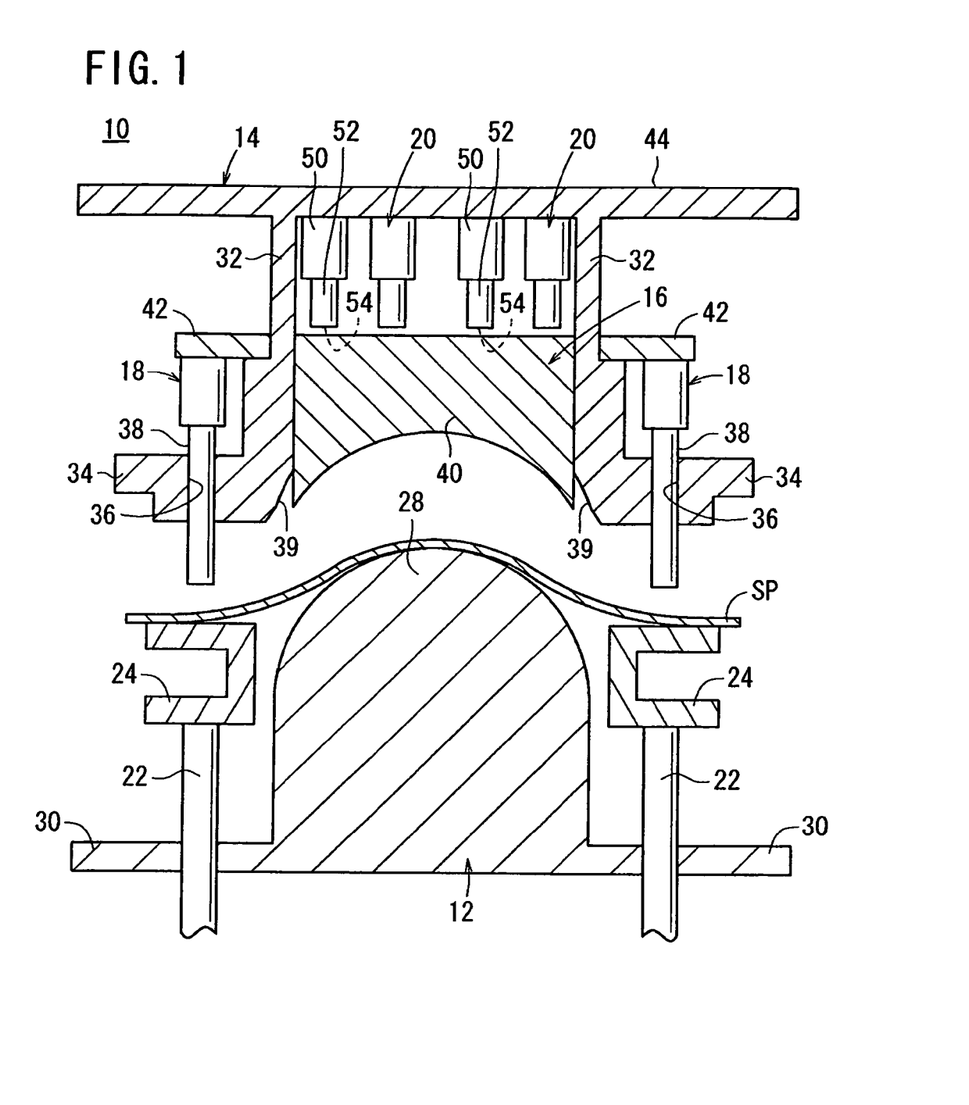
FIG. 1 is a longitudinally cross-sectional view illustrating a primary part of a molding apparatus according to an exemplary embodiment of the invention.

FIG. 1 is a longitudinally cross-sectional view illustrating a primary part of a molding apparatus 10 according to the exemplary embodiment of the invention. This molding apparatus 10 is used to perform press-molding. The molding apparatus 10 includes a lower die 12, an upper die 14 which is vertically displaced to move closer to and away from the lower die 12, a movable die 16 displacably held by the upper die 14, two movable die displacing cylinders 18 (movable die displacing mechanism) provided on the movable die 16, and four fluid springs 20 attached to the upper die 14. Incidentally, in FIG. 1, reference character SP designates a side panel which is a work piece.

Two cylindrical members 22, 22 are displacably inserted into the lower die 12. Further, cross-sectionally U-shaped work support members 24, 24 are provided on end portions of the cylindrical members 2, 22, respectively. End portions of the side panel SP are respectively placed on the work support members 24, 24.

The lower die 12 has a molding portion 28 bulging from a base portion 26. The molding portion 28 is curved so that a longitudinal cross-section is approximately hemiellipse-shaped. The side panel SP is further curved by this molding portion 28.

The upper die 14 is supported by a bolster (not shown) which is displaceable along an up-down direction, as viewed in FIG. 1, under the action of a drive mechanism (not shown). That is, the upper die 14 moves closer to or away from the lower die 12 along with the bolster.

The upper die 14 includes two pendent portions 32, 32 suspending from a base portion 30 which extends horizontally, and horizontal portions 34, 34 that respectively bend from the pendent portions 32, 32 and extend horizontally. The pendent portions 32, 32 are opposed to each other. The movable die 16 is inserted between the pendent portions 32, and 32.

A through-hole (not shown) is formed in each of the pendent portions 32, 32 to extend along the direction in which each pendent portion 32 extends, i.e., a vertical direction. On the other hand, through holes 36, 36 are respectively formed in the horizontal portions 34, 34. A displacing rod 38 which is in part a component of the movable die displacing cylinder 18 is inserted into each through hole 36.

Two molding portions 39, 39 are formed by being curvedly cut out from portions of the upper die extending from the end surface of the horizontal portions 34, 34 facing the lower die 12, to the sides of the pendent portions 32, 32 which face the movable die 16. The molding portions 39, 39 are facing to respective end portions of the molding portion 28 of the lower die 12.

The movable die 16 includes a molding portion 40 opposed to the molding portion 28 of the lower die 12, and horizontally extending portions 42, 42, from which the molding portion 40 extends horizontally, formed by extrusion from the molding portion 40. Among these portions, the molding portion 40 is provided with a concave portion which is curved corresponding to the curvature of the molding portion 28 of the lower die 12. The horizontally extending portions 42, 42 respectively protrude from the through holes formed in the pendent portions 32, 32 of the upper die 14. The movable die displacing cylinders 18, 18 are respectively positioned at and fixed to end portions of the protruded horizontally extending portions 42, 42.

Furthermore, the fluid springs 20 are attached to a base portion 44 of the upper die 14 in parallel to the pendent portions 32, 32 of the upper die 14.

Figure 2:
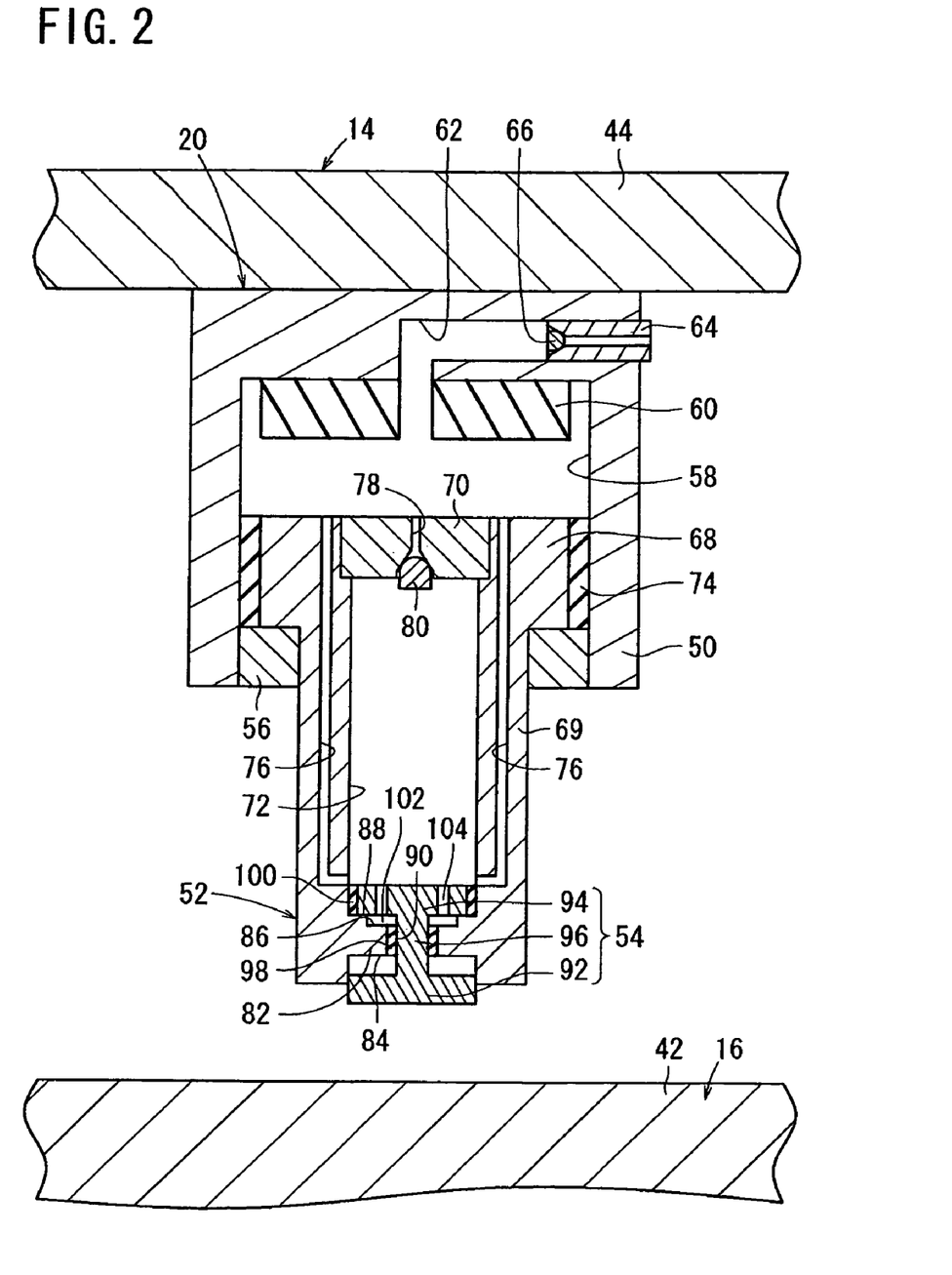
FIG. 2 is a schematically longitudinally cross-sectional view illustrating the entire fluid spring of the molding apparatus illustrated in FIG. 1.

Referring now to FIG. 2, there is shown a schematic longitudinally cross-sectional view of the entire fluid spring 20. The fluid spring 20 includes a sleeve 50, a hollow piston rod 52 partially accommodated in the sleeve 50, and a displacing piston rod 54 provided at an end portion of the hollow piston rod 52.

The sleeve 50 is a cylindrical element having an opening formed at one end thereof. A blocking member 56 is inserted into the opening of the sleeve 50. Consequently, a first chamber 58 accommodating operating-air, which is a fluid, is formed in sleeve 50.

A buffer member (seating member) 60 made of polyurethane rubber is fixed to the ceiling surface of the sleeve 50. As will be described below, the hollow piston rod 52 is seated on the buffer member 60.

An introducing passage 62 is formed in the sleeve 50 and the buffer member 60. Operating air is introduced into the first chamber 58 via the introducing passage 62. Incidentally, a supply tube 64 is inserted into the introducing passage 62 of the sleeve 50. A check valve 66 is provided at an end of the supply tube 64. The check valve 66 prevents operating air in the first chamber 58 from leaking out of the fluid spring 20.

The hollow piston rod 52 is constructed by fitting a cap member 70 into the cylindrical element 69 having a flange portion 68. As a result of fitting the cap member 70 thereinto, a second chamber 72 is formed in hollow piston rod 52. The flange portion 68 is supported by the blocking member 56. Consequently, the hollow piston rod 52 is prevented from slipping from the sleeve 50. Incidentally, a seal member 74 is interposed between a side wall of the flange portion 68 and the inner wall of the sleeve 50.

A plurality of first communicating passages 76 for making the first chamber 58 and the second chamber 72 communicate with each other are formed between the inner wall and the outer wall of the hollow piston rod 52. Incidentally, FIG. 2 illustrates only two of the plurality of first communicating passages 76.

A second communicating passage 78 for making the first chamber 58 and the second chamber 72 communicate with each other is formed in the cap member 70 constituting an end portion of the hollow piston rod 52. A check valve 80 is provided in the second communicating passage 78. The check valve 80 opens when the internal pressure of the first chamber 58 reaches a predetermined value, to thereby introduce operating air (fluid) from the first chamber 58 to the second chamber 72. That is, in the present embodiment, the second communicating passage 78 is provided with the check valve 80 which only permits operating air to flow in the direction from the first chamber 58 towards the second chamber 72.

Two step portions 84 and 86 are formed in a bottom wall 82 constituting the other end portion of the hollow piston rod 52 so that the longitudinal cross-section is substantially H-shaped. Additionally, an annular seating portion 88 is formed in the step portion 86. On the other hand, an insertion hole 90 is formed in the bottom wall 82.

The displacing piston rod includes a first disk portion (exposed portion) 92 exposed from out of the hollow piston rod 52, a second disk portion (displacing portion) 94 accommodated in the hollow piston rod 52, and a connecting cylindrical portion 96 that connects the first disk portion 92 and the second disk portion 94 to each other. Among these portions, the connecting cylindrical portion 96 is inserted into the insertion hole 90. A bearing 98 is mounted in the insertion hole 90. The bearing 98 seals between the insertion hole 90 and the connecting cylindrical portion 96.

A packing 100 is mounted on the side wall of the second disk portion 94. When the displacing piston rod 54 is displaced, this packing 100 slides while maintaining contact with the inner wall of the hollow piston rod 52. When the displacing piston rod 54 is placed at the bottom dead center as illustrated in FIG. 2, the second disk portion 94 is separated away from the step portion 86 and is seated on the seating portion 88. Thus, a third chamber 102 is formed between the step portion 86 (i.e., the top surface of the bottom wall 82) and the second disk portion 94.

Further, a plurality of passages 104 are formed, which extend along the direction of height (i.e., the vertical direction, as viewed in FIG. 2). That is, the third chamber 102 formed between the step portion 86 and the second disk portion 94 and the second chamber 72 formed between the second disk portion 94 and the cap member 70 are made to communicate with each other via these passages 104. Consequently, the internal pressure of the second chamber 72 is made to be always equal to that of the third chamber 102.

Basically, the molding apparatus 10 according to the present embodiment is constructed in the aforementioned manner. Next, operations and advantages of the molding apparatus 10 are described below.

A press-molding is performed using the molding apparatus 10 in the following manner.

First, as illustrated in FIG. 1, the side panel SP is inserted between the lower die 12 and the movable die 16. At that time, each end portion of the side panel SP is placed on one of two work supporting members 24, 24. At this point in time, as illustrated in FIG. 2, a small clearance is formed between the movable die 16 and the first disk portion 92 of the displacing piston rod 54. Both the displacing piston rod 54 and the hollow piston rod 52 are placed at the bottom dead center illustrated in FIG. 2. Of course, the first chamber 58, the second chamber 72, and the third chamber 102 are preliminarily filled with operating-air. The internal pressures of the second chamber 72 and the third chamber 102 are equal to each other.

Figure 3:
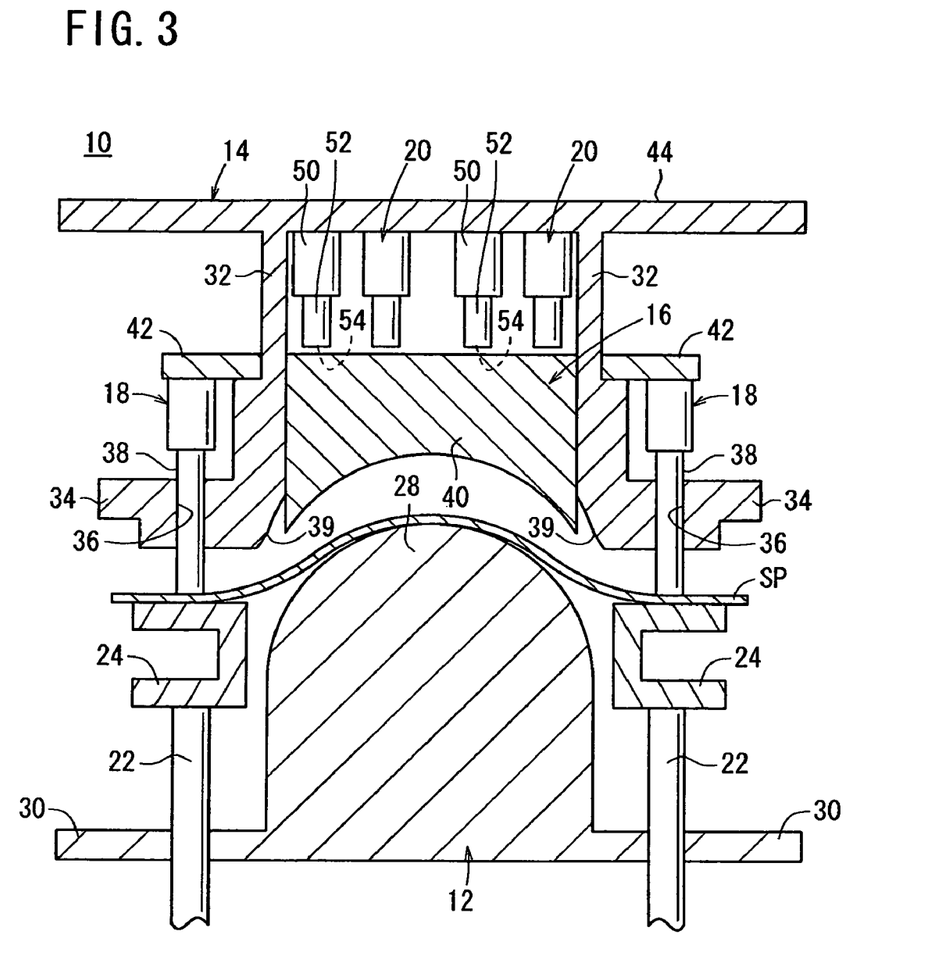
FIG. 3 is a longitudinally cross-sectional view illustrating a state in which end portions of a side panel are clamped by the molding apparatus.

Next, the drive mechanism (not shown) is urged. Consequently, the upper die 14 moves towards the lower die 12 together with the bolster. On the way thereto, the displacing rods 38, 38 of the movable die displacing cylinders 18, 18 abut against the end portions of the side panel SP, respectively, as illustrated in FIG. 3. Consequently, each end portion of the side panel SP is supported while being clamped by one of the work supporting members 24, 24 and one of the displacing rods 38, 38.

Figure 4:
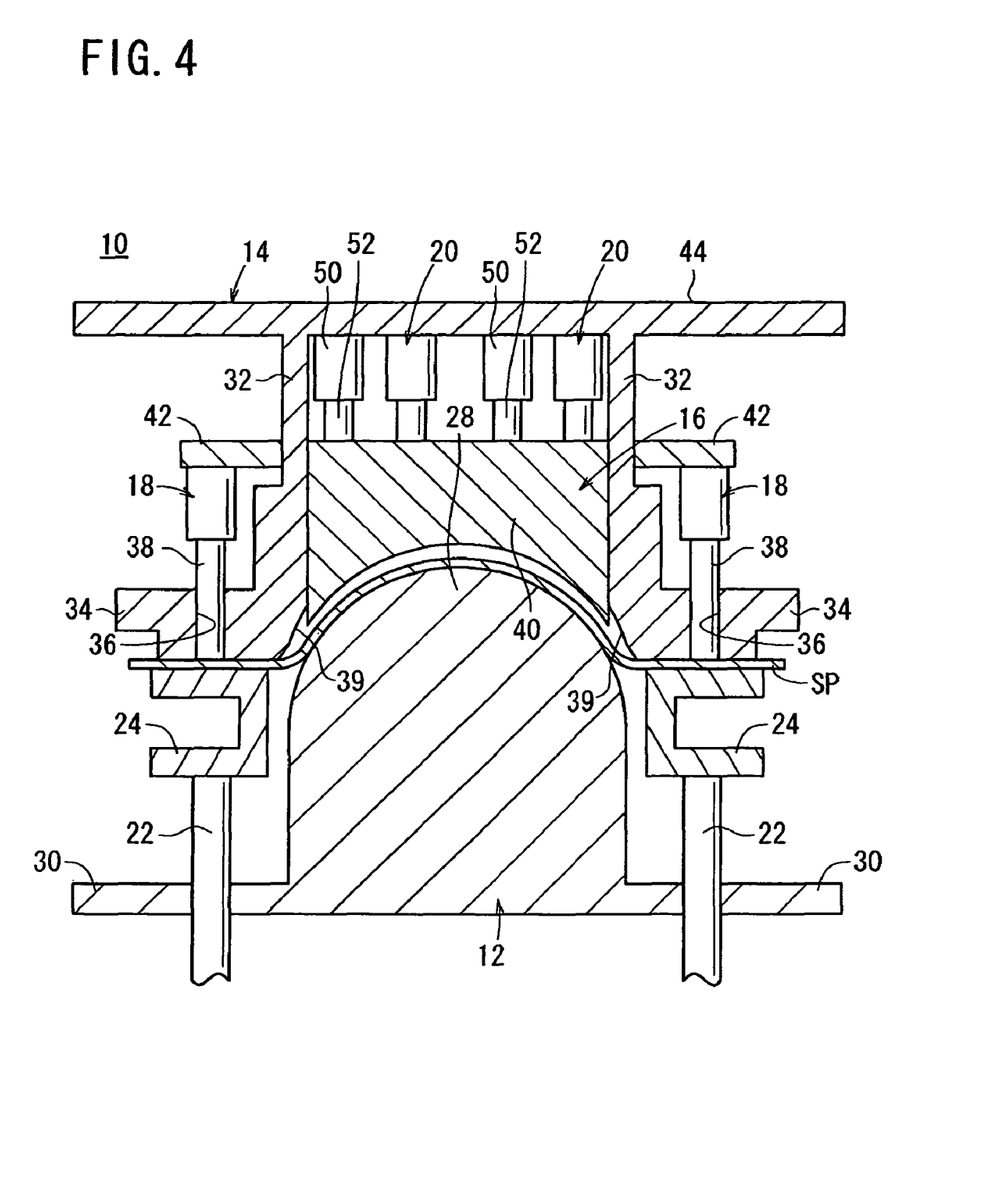
FIG. 4 is a longitudinally cross-sectional view illustrating a state in which the upper die of the molding apparatus illustrated in FIG. 1 further descends.
Figure 5:
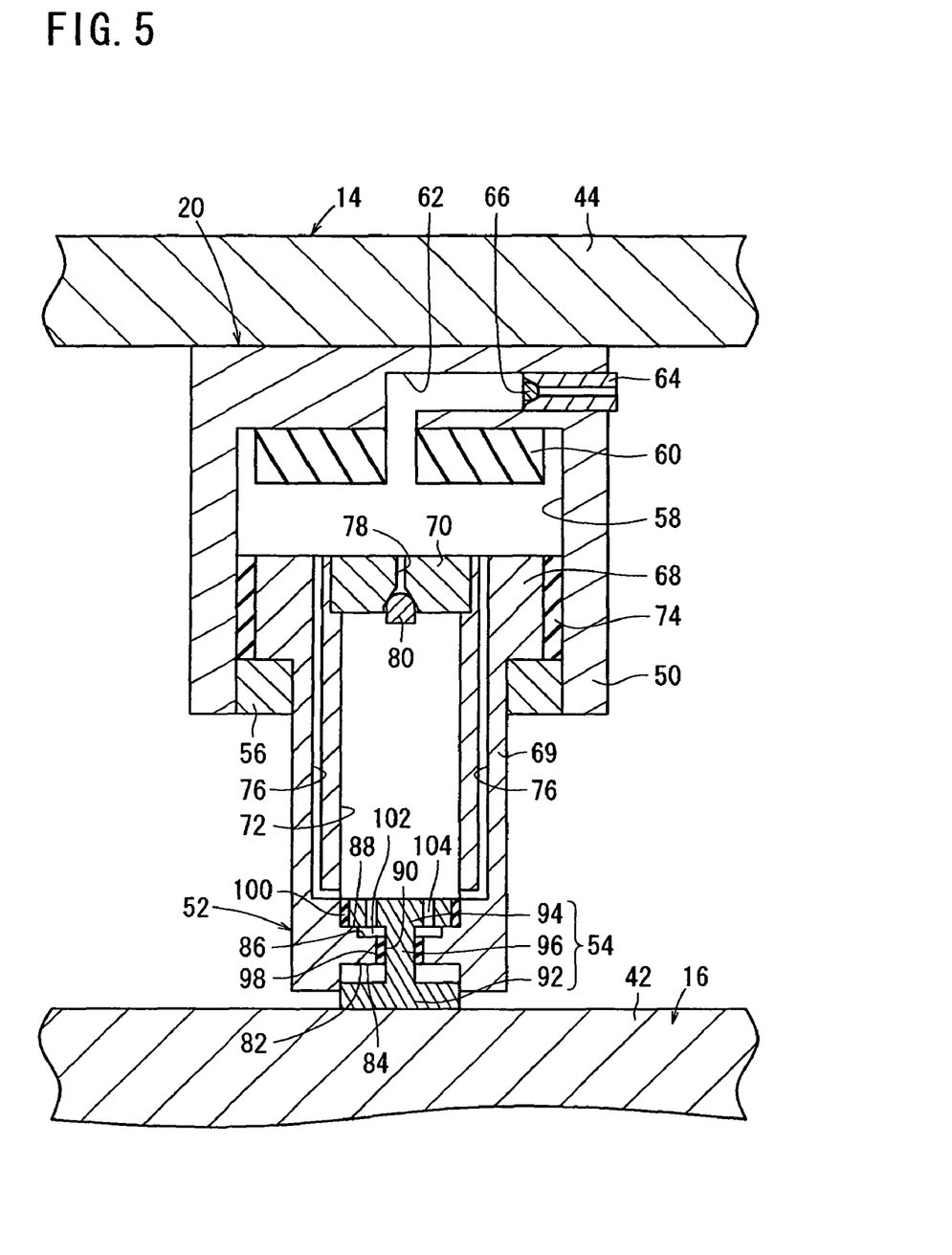
FIG. 5 is a schematic longitudinally cross-sectional view illustrating the entire fluid spring corresponding to the state illustrated in FIG. 4.

When the descent of the upper die 14 is further continued, the cylindrical members 22, 22 descend. In addition, the displacing rods 38, 38 further contract (see FIG. 4). On the other hand, the fluid spring 20 and the movable die 16 move closer to each other. As illustrated in FIGS. 4 and 5, the first disk portion 92 of the displacing piston rod 54 abuts against the movable die 16.

Figure 6:
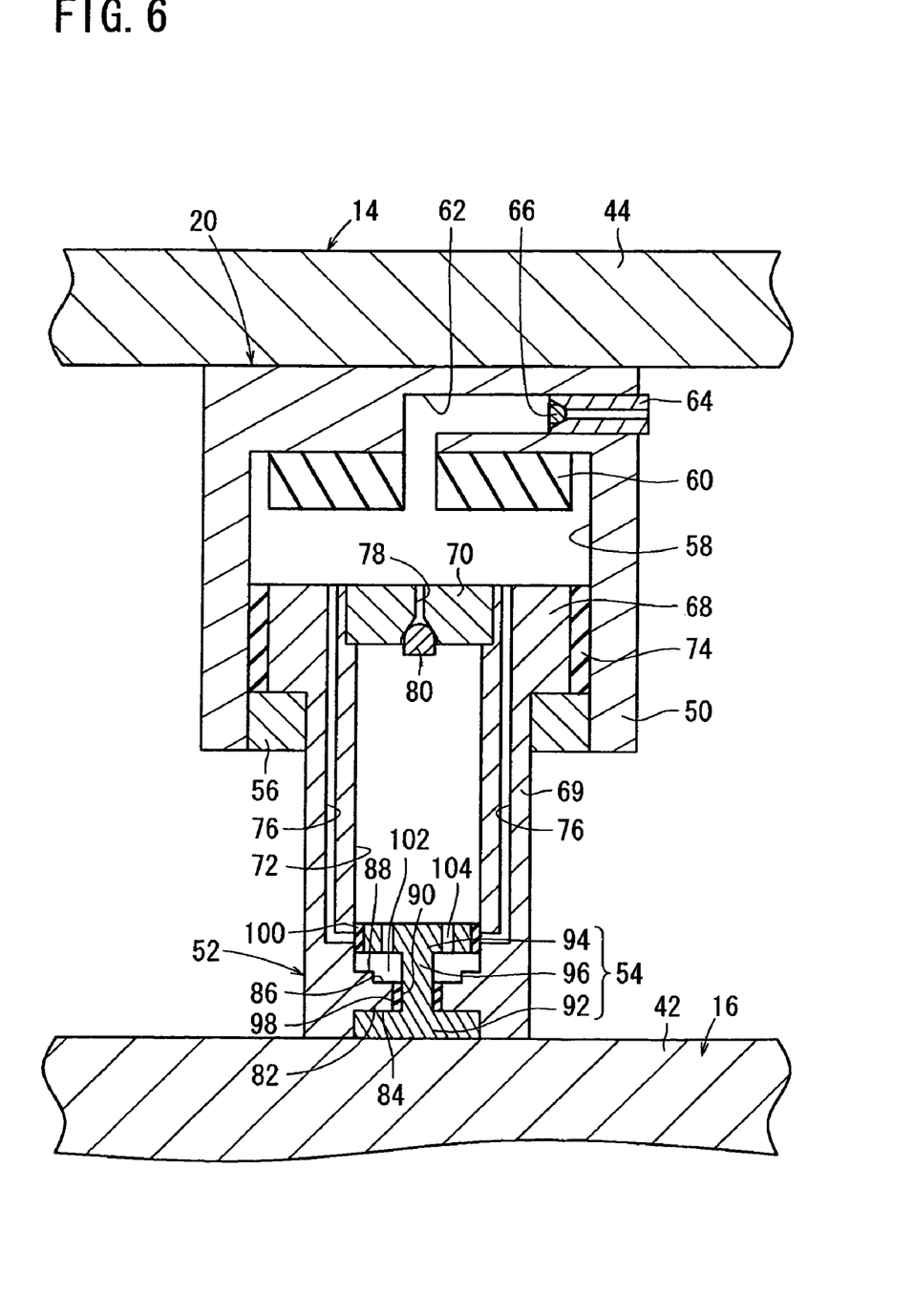
FIG. 6 is a schematic longitudinally cross-sectional view illustrating the entire fluid spring displaced so that a displacement piston rod is accommodated further in a hollow piston rod.

Subsequently, the first disk portion 92 is pushed by the movable die 16. Consequently, the displacing rod 54 is displaced so as to be accommodated further into the hollow piston rod 52. Finally, the piston rod 54 reaches a top dead center illustrated in FIG. 6. At that time, the first disk portion 92 is seated on the bottom wall 82. In addition, the packing 100 mounted on the side wall of the second disk portion 94 blocks up the first communicating passage 76.

The descent of the upper die 14 is further continued. At the same time, the movable die 16 descends while being pushed by the fluid spring 20. Simultaneously, the displacing rod 38 contracts further (see FIG. 7). From this it can be understood that the pushing force of the fluid spring 20 at that time is larger than that of the movable die cylinders 18, 18.

Figure 7:
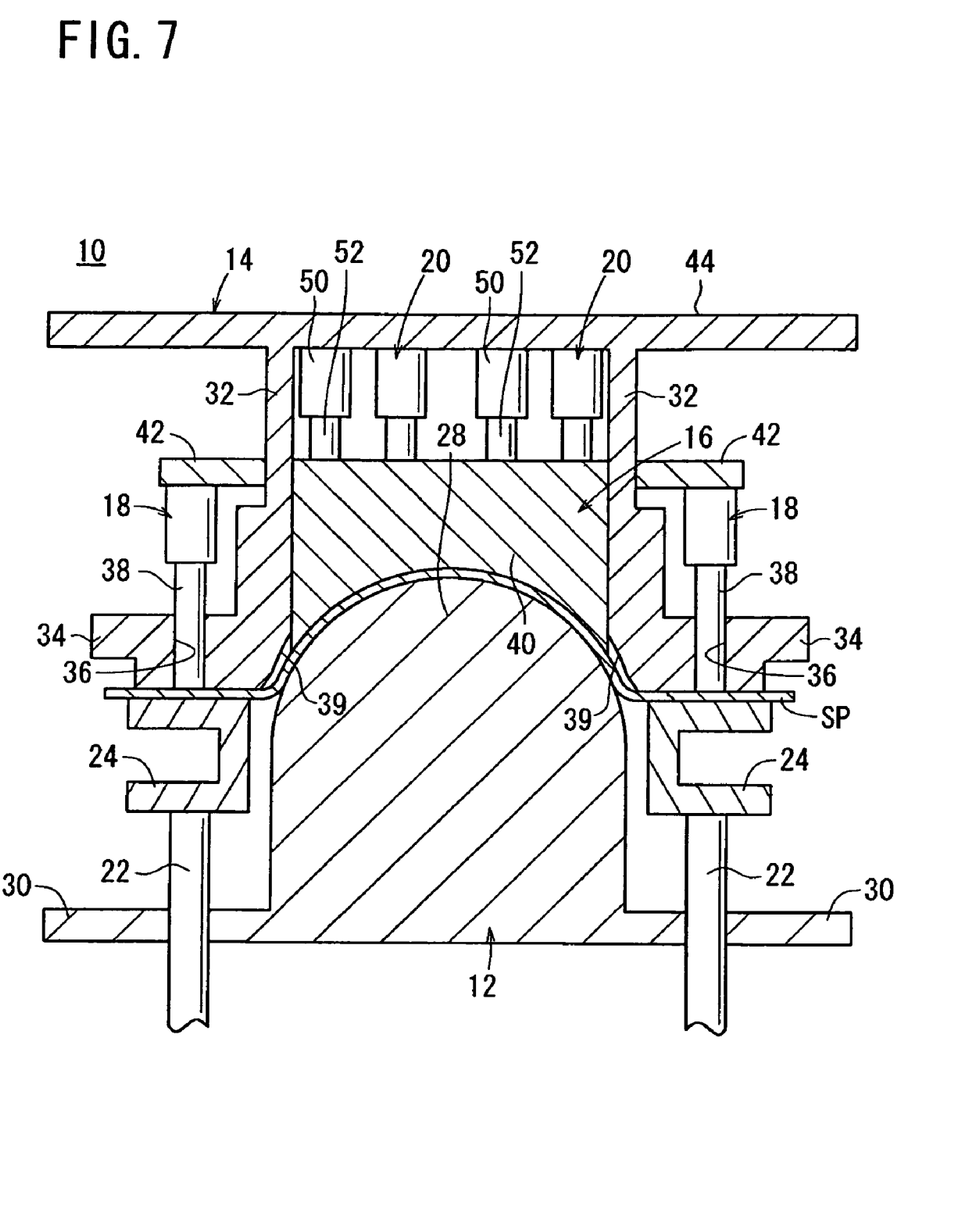
FIG. 7 is a longitudinally cross-sectional view illustrating a state in which the upper die of the molding apparatus illustrated in FIG. 1 reaches bottom dead center.

As illustrated in FIG. 7, when the upper die 14 reaches a predetermined position and the movable die 16 reaches the bottom dead center, in the side panel SP, a central portion (hard-to-mold portion), the molded amount of which is relatively large, is clamped between the molding portion 28 of the lower die 12 and the molding portion 40 of the movable die 16. The hard-to-mold portion is formed according to the shapes of the molding portions 28 and 40. It is apparent that at that time, an amount of contraction of the displacing rod 38 of each of the movable die displacing cylinders 18, 18 is maximized.

Figure 8:
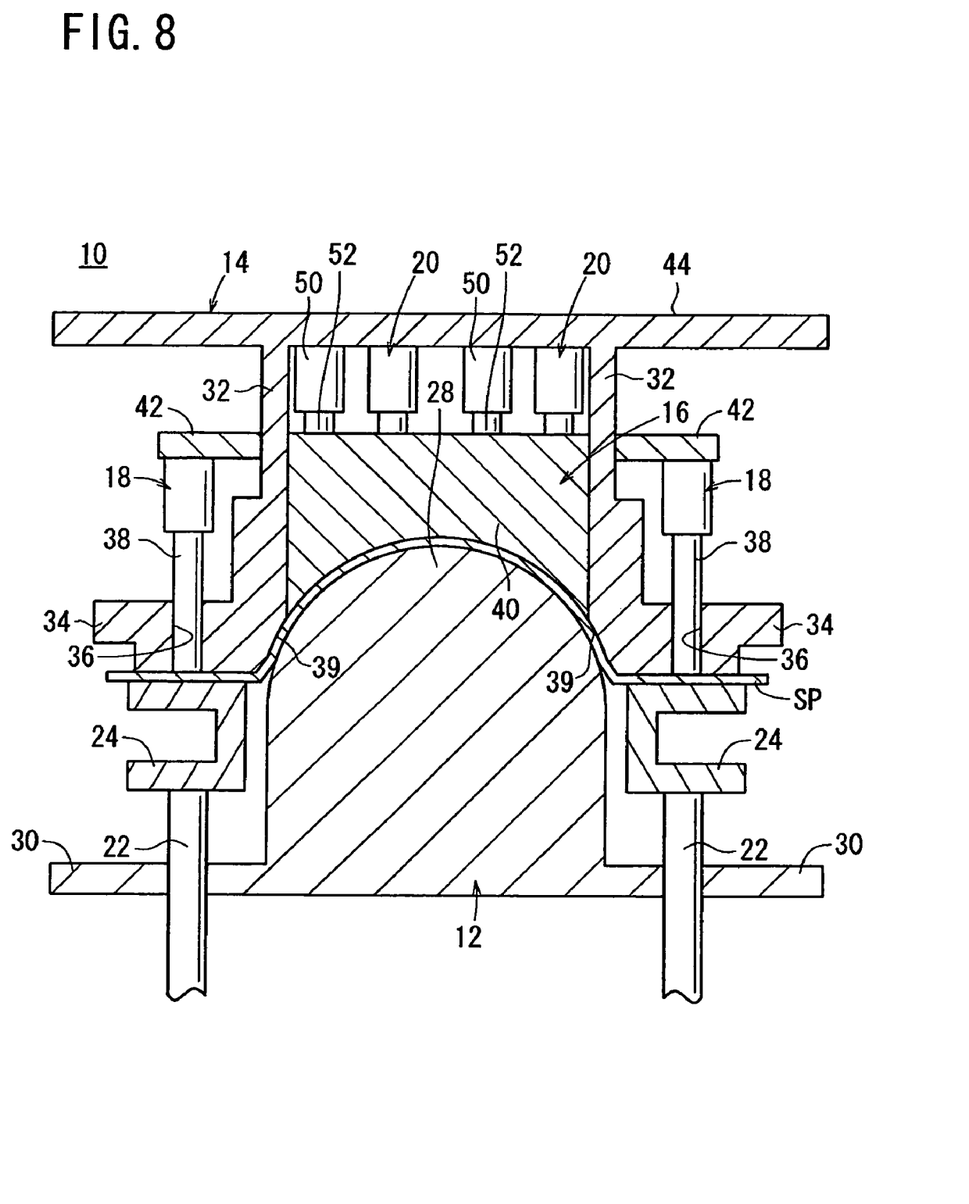
FIG. 8 is a longitudinally cross-sectional view illustrating a state in which the displacement rod of the molding apparatus illustrated in FIG. 1 starts extending.

Next, as illustrated in FIG. 8, the fluid spring 20 contracts and the cylindrical members 22, 22 descend. Along with this, the upper die 14 descends to the bottom dead center. In the side panel SP, a part between the hard-to-mold portion and the end portion thereof is molded by being clamped between the molding portion 39 of the upper die 14 and the edge portion of the molding portion 28 of the lower die 12. During this time period, both the displacing rods 38 and 38 are extended, so that the abutment thereof against the side panel S is maintained.

Figure 9:
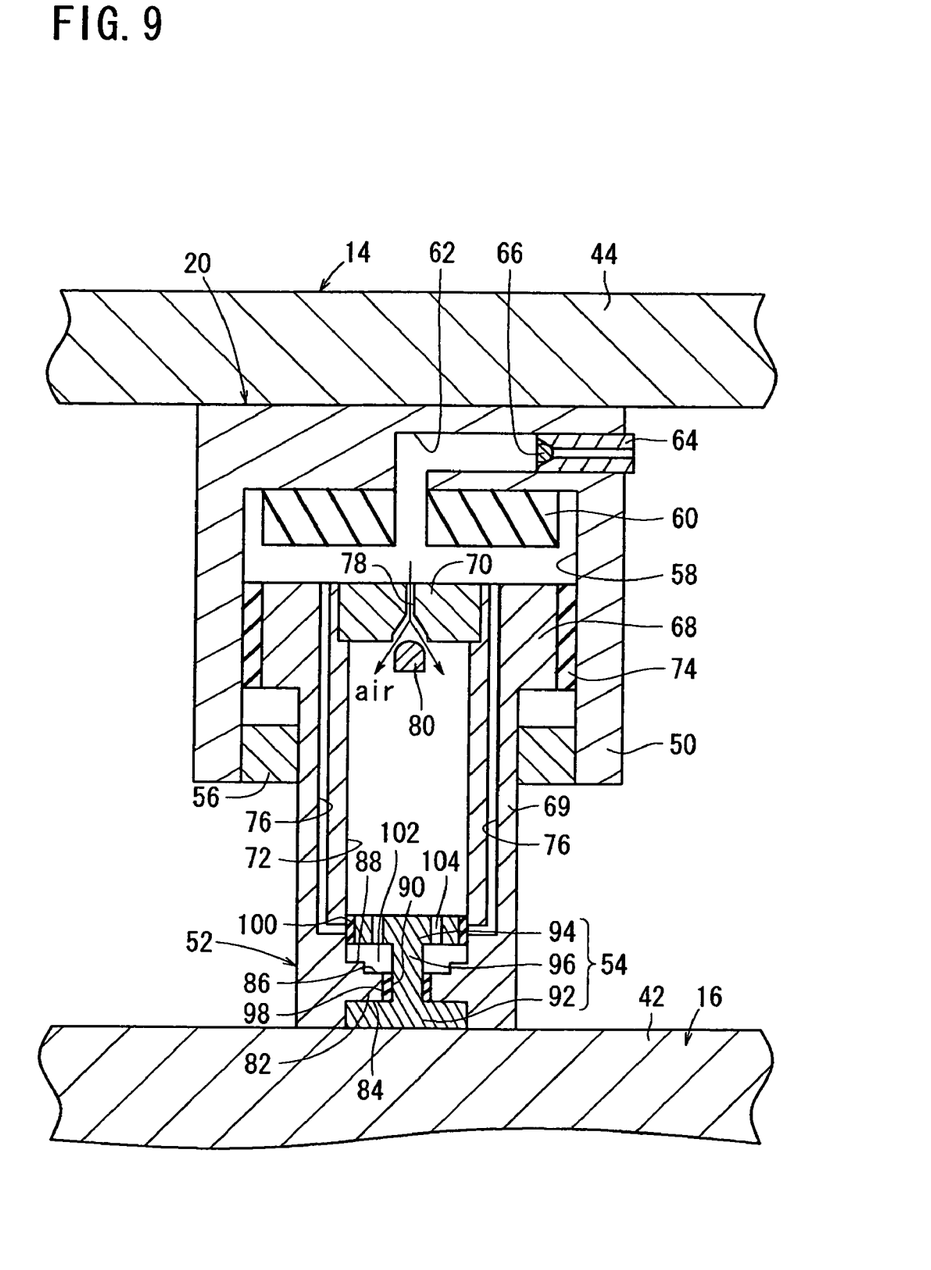
FIG. 9 is a schematic longitudinally cross-sectional view illustrating the entire fluid spring in a state in which a check valve in the hollow piston rod is opened.

As illustrated in FIG. 9, at that time, the hollow piston rod 52 is displaced towards the buffer member 60. That is, the fluid spring 20 contracts. At that time, because the first communicating passage 76 is blocked up, the check valve 80 is opened. Consequently, the second communicating passage 78 is opened. Then, operating air starts to be introduced into the second chamber 72.

Incidentally, the total capacity of the first chamber 58 and the second chamber 72 decreases with contraction of the fluid spring 20. Accordingly, both the internal pressure of the first chamber 58 and that of the second chamber 72 rise. On the other hand, because the second communicating passage 78 is released, a state in which the internal pressure of the first chamber 58 and that of the second chamber 72 are equal to each other, is maintained.

Figure 10:
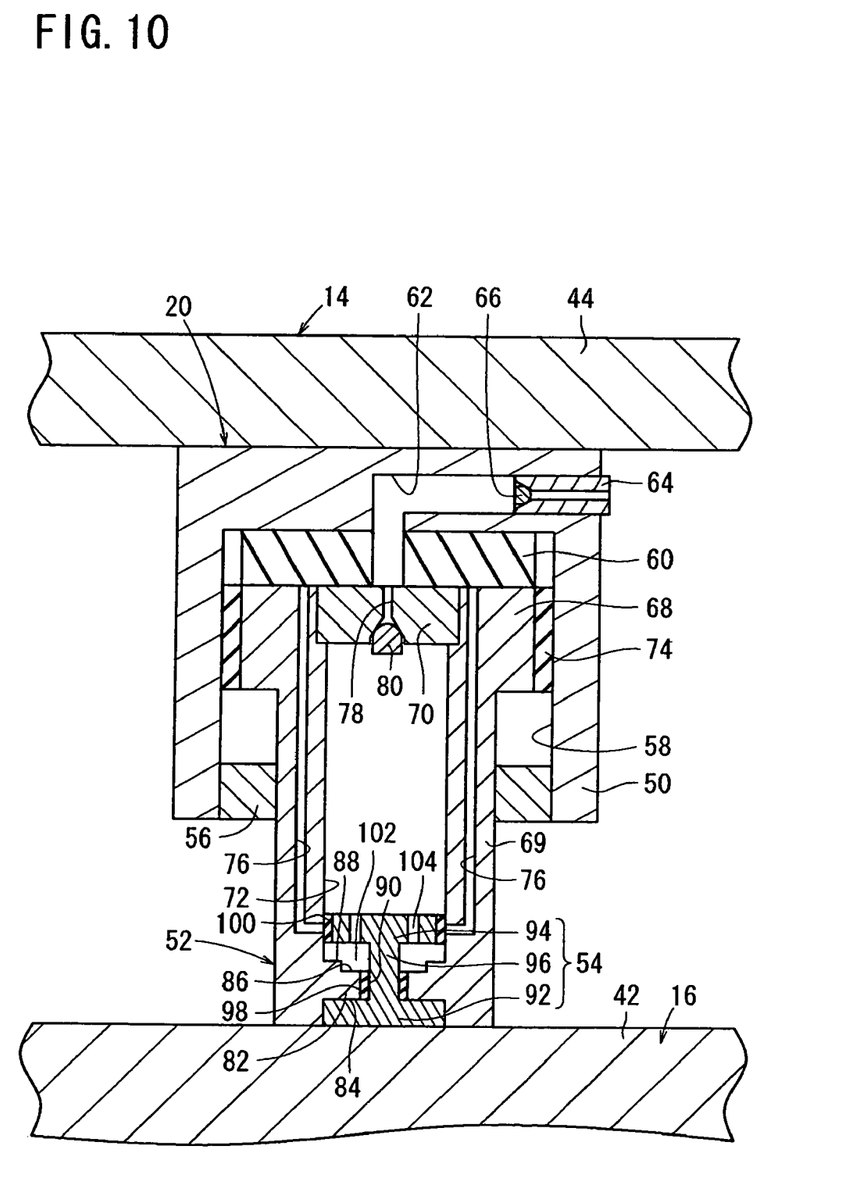
FIG. 10 is a schematically longitudinally cross-sectional view illustrating the entire fluid spring in a state in which the hollow piston rod reaches top dead center.

Finally, as illustrated in FIG. 10, the hollow piston rod 52 reaches the top dead center. Thus, the flange portion. 68 and the cap member 70 are seated on the buffer member 60. That is, the capacity of the first chamber 58 becomes substantially zero. At that time, the internal pressure of the first chamber 58 and the second chamber 72 and also the introducing passage 62 is maximized.

Figure 11:
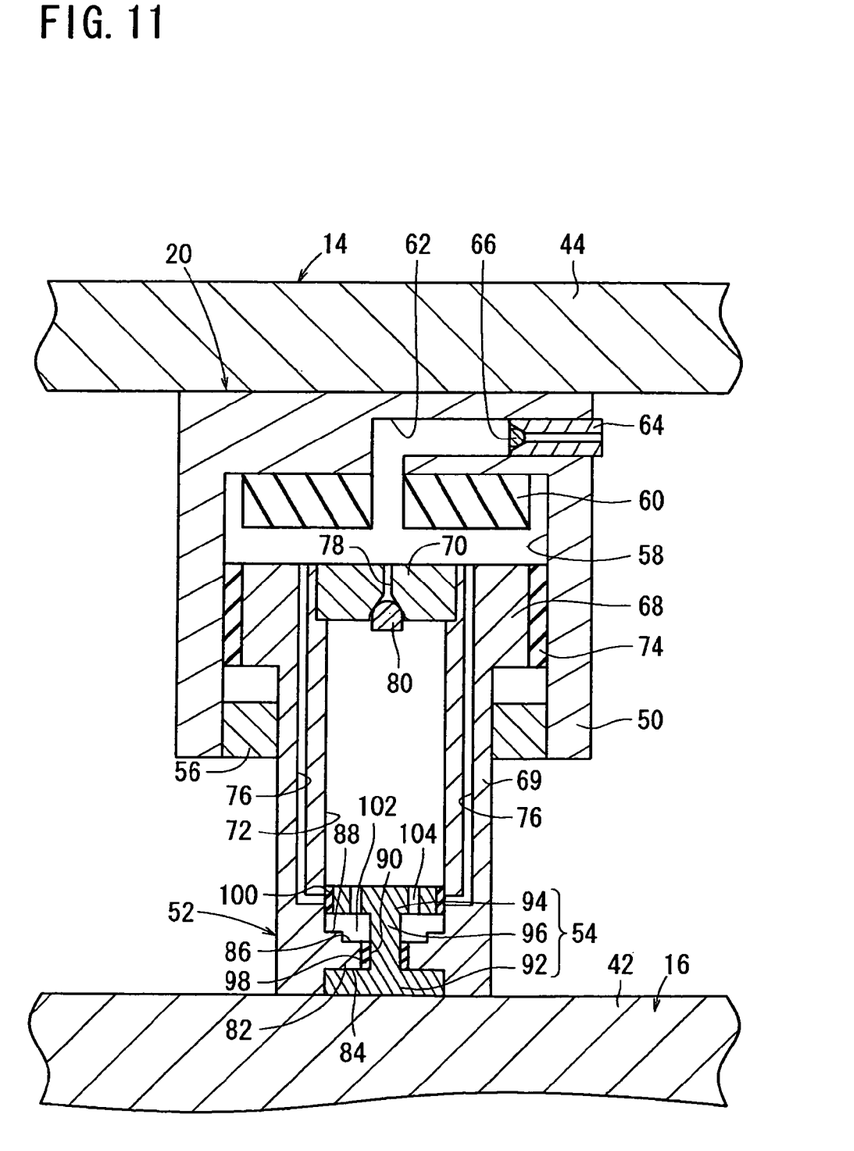
FIG. 11 is a schematic longitudinally cross-sectional view illustrating the entire fluid spring in a state in which a sleeve of the fluid spring is slightly raised.

In this state, the bolster and the upper die 14 are urged so as to be displaced upwardly due to the action of the drive mechanism. When the movable die 16 slightly rises from the bottom dead center on the way upward, the sleeve 50 is slightly lifted, as illustrated in FIG. 11.

Along with this, the capacity of the first chamber increases considerably from substantially zero, so that the internal pressure of the first chamber 58 is greatly reduced. Consequently, the pushing force of the fluid spring 20 becomes smaller than that of the movable die displacing cylinder 18.

Figure 12:
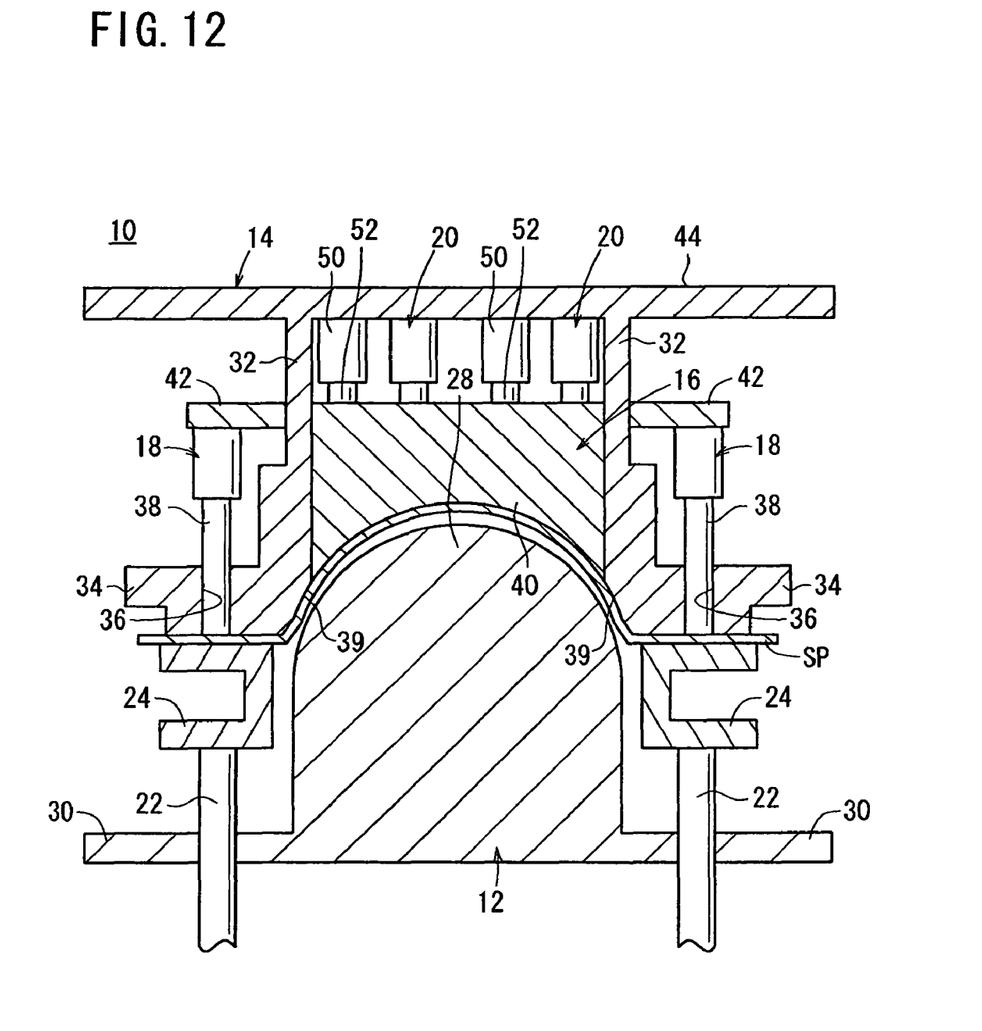
FIG. 12 is a schematic longitudinally cross-sectional view illustrating a primary part of the fluid spring in a state in which the upper die and the movable die of the molding apparatus illustrated in FIG. 1 ascend.

In this way, the internal pressure of the fluid spring 20 is adjusted along with the pushing force. As illustrated in FIG. 12, the upper die 14, the movable die 16, and the work supporting member 24 all can be lifted by the rise of the upper die 14 and the extension of the displacing rod 38. Thus, the molded side panel SP is exposed. Consequently, problems, such as a molding failure, which would be caused by in a case where the movable die 16 is not lifted, can be prevented from occurring.

Figure 13:
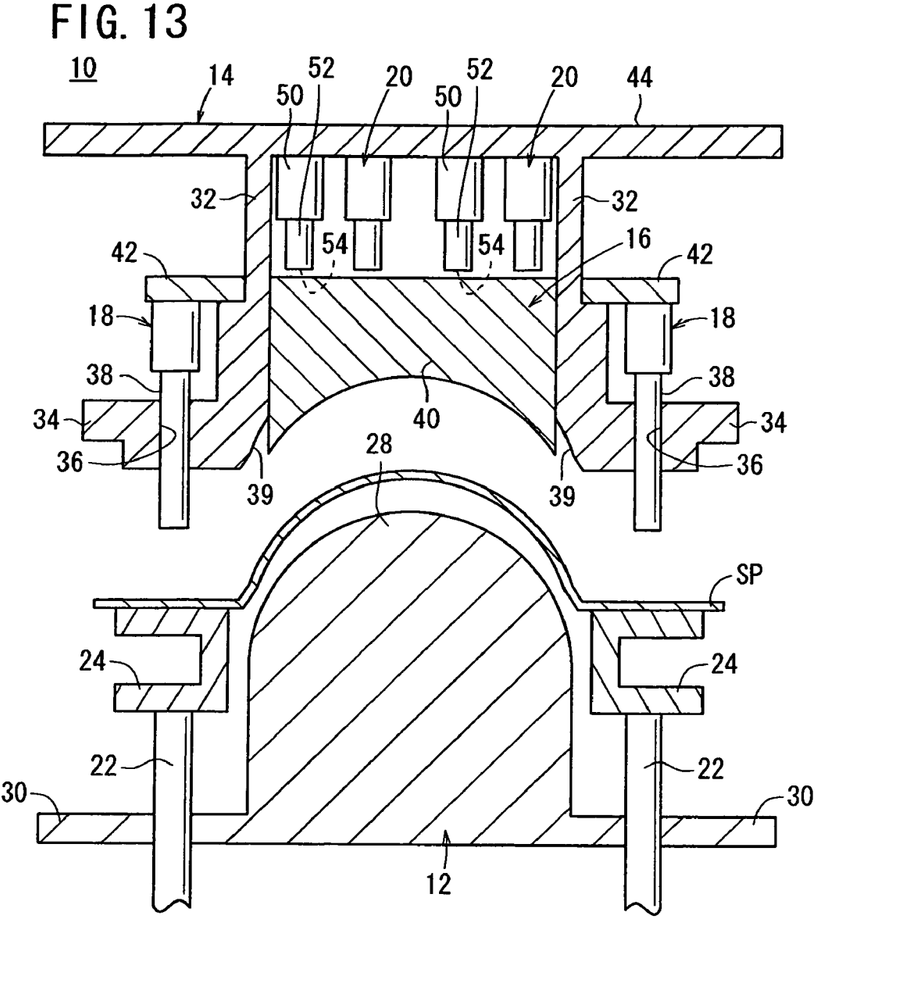
FIG. 13 is a schematic longitudinally cross-sectional view illustrating a primary part of the fluid spring in a state in which the upper die and the movable die further ascend.

After the displacing rod 38 is extended to the maximum and the first disk portion 92 of the displacing piston rod 54 is separated from the movable die 16, as illustrated in FIG. 13, the second disk portion 94 is seated on the seating portion 88, as illustrated in FIG. 1. Thus, the apparatus returns to the initial state. In subsequent moldings of side panels, the same process is repeated.

Thus, according to the present embodiment, the pushing of the hollow piston rod 52 by the internal pressure of the fluid spring 20 can be changed, that is, the extending force at the time of contraction of the fluid spring 20 can be made to differ from that at the time of extension of the fluid spring 20. That is, the fluid spring can made so that while the extending force at the time of contraction of the fluid spring is increased, the extending force at the time of extension after the fluid spring 20 has contracted is reduced.

Accordingly, in a case where the fluid spring 20 is incorporated into the molding apparatus 10, similarly to the present embodiment, when the die is closed (when molding), the fluid spring 20 generates a pushing force that is larger than a pushing force of the movable die displacing cylinder 18. On the other hand, when opening the die, the fluid spring 20 generates a pushing force that is smaller than the pushing force of the movable die displacing cylinder 18. Accordingly, when the die is closed, the hard-to-mold portion can be molded using the movable die 16 earlier than the other portions of the work piece. In addition, when the die is opened, the upper die 14, the movable die 16, and the work support member 24 can simultaneously be lifted while the movable die 16 is lifted by action of the movable die displacing cylinder 18.

Additionally, according to the present embodiment, air is used by being circulated as an operating fluid of the fluid spring 20. Thus, the present embodiment does not need additional provision of a tank and piping, which are required in the case of using operating oil as the operating fluid. Accordingly, the configuration of equipment provided in the apparatus is simplified. In addition, the present embodiment can obtain the advantage of reducing the equipment investment.

Incidentally, although the above embodiment selects air as an operating fluid, another gas, such as nitrogen gas, can be selected as the operating fluid. Alternatively, oil can be selected as the operating fluid. However, in the case of using oil, frictional heat is generated due to viscosity thereof. Accordingly, the inflow velocity thereof is slightly limited. Therefore, air is more preferable as the operating fluid than oil.

Further, the work piece is not limited to a side panel SP of an automobile body. Obviously, other things can be used as the work piece.

While description has been made in connection with specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF REFERENCE NUMERALS AND SIGNS 10 molding apparatus
12 lower die
14 upper die
16 movable die
18 die displacing cylinder
20 fluid spring
24 work supporting member
28, 39, 40 molding portions
38 displacing rod
50 sleeve
52 hollow piston rod
54 displacement piston rod
58 first chamber
60 buffering member
62 introducing passage
64 supply tube
72 second chamber
76 first communicating passage
78 second communicating passage
80 check valve
92 first disk portion
94 second disk portion
96 connecting cylinder
SP side panel

What is claimed is:

1. A fluid spring comprising:
   a sleeve;
   a first chamber configured to accommodate a fluid and formed in the sleeve;
   a hollow piston rod, wherein a part of the hollow piston rod is displacably accommodated in the first chamber;
   a second chamber configured to accommodate the fluid and formed in the hollow piston rod;
   a communicating passage configured to make the first chamber and the second chamber communicate with each other and formed in an end portion of the hollow piston rod, wherein the communicating passage only permits the fluid to flow in a direction from the first chamber to the second chamber;
   an additional passage configured to make the first chamber and the second chamber communicate with each other; and
   an opening/closing portion configured to open and close the additional passage;
   wherein the opening/closing portion includes a displacing piston rod provided at an end portion of the hollow piston rod and configured to be displaceable with respect to the hollow piston rod, and
   wherein the displacing piston rod is movable between an opening position for opening the additional passage and a closing position for closing the additional passage.

2. The fluid spring according to claim 1, wherein the displacing piston rod further includes an exposing portion connected to the displacing portion so as to be exposed from the hollow piston rod,
   wherein the additional passage is formed between an inner circumferential wall and an outer circumferential wall of the hollow piston rod, and
   wherein the additional passage is closed when the displacing portion is positioned in its upper dead center.

3. A molding apparatus comprising:
   a lower die;
   an upper die movable closer to and away from the lower die;
   a movable die held by the upper die and movable with respect to the upper die;
   a movable die displacing mechanism provided in the movable die to urge the movable die in a direction away from the lower die; and
   a fluid spring provided in the upper die to urge the movable die in a direction away from the upper die,
   wherein the fluid spring comprises:
      a sleeve;
      a first chamber configured to accommodate a fluid and formed in the sleeve;
      a hollow piston rod, wherein a part of the hollow piston rod is displacably accommodated in the first chamber;
      a second chamber configured to accommodate the fluid and formed in the hollow piston rod;
      a communicating passage configured to make the first chamber and the second chamber communicate with each other and formed in an end portion of the hollow piston rod,
   wherein the communicating passage only permits the fluid to flow in a direction from the first chamber to the second chamber;

an additional passage configured to make the first chamber and the second chamber communicate with each other; and an opening/closing portion configured to open and close the additional passage;

wherein the opening/closing portion includes a displacing piston rod provided at an upper end portion of the hollow piston rod and configured to be displaceable with respect to the hollow piston rod, and wherein the displacing piston rod is movable between an opening position for opening the additional passage and a closing position for closing the additional passage.

4. The molding apparatus according to claim 3, wherein the displacing piston rod comprises an exposing portion connected to the displacing portion so as to be exposed from the hollow piston rod, wherein the additional passage is formed between an inner circumferential wall and an outer circumferential wall of the hollow piston rod, and wherein the additional passage is closed when the displacing portion is positioned in its upper dead center.

* * * * *